(12) United States Patent
Matsuo

(10) Patent No.: US 7,979,278 B2
(45) Date of Patent: Jul. 12, 2011

(54) SPEECH RECOGNITION SYSTEM AND SPEECH FILE RECORDING SYSTEM

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 10/285,482

(22) Filed: Nov. 1, 2002

(65) Prior Publication Data

US 2003/0163308 A1 Aug. 28, 2003

(30) Foreign Application Priority Data

Feb. 28, 2002 (JP) .................................. 2002-054368

(51) Int. Cl.
*G10L 15/04* (2006.01)
(52) U.S. Cl. ........ 704/251; 704/231; 704/246; 704/247; 704/252
(58) Field of Classification Search .................. None
See application file for complete search history.

(56) References Cited

U.S. PATENT DOCUMENTS

| | | | | |
|---|---|---|---|---|
| 5,903,871 A | * | 5/1999 | Terui et al. ..................... | 704/500 |
| 5,991,719 A | * | 11/1999 | Yazaki et al. .................. | 704/251 |
| 6,078,885 A | * | 6/2000 | Beutnagel ...................... | 704/258 |
| 6,185,530 B1 | * | 2/2001 | Ittycheriah et al. ........... | 704/255 |
| 6,195,641 B1 | | 2/2001 | Loring et al. | |
| 6,230,126 B1 | * | 5/2001 | Kuroda ........................... | 704/231 |
| 6,308,151 B1 | * | 10/2001 | Smith ............................. | 704/235 |
| 6,334,102 B1 | * | 12/2001 | Lewis et al. .................... | 704/255 |
| 6,345,252 B1 | | 2/2002 | Beigi et al. | |
| 6,434,547 B1 | * | 8/2002 | Mishelevich et al. ............. | 707/3 |
| 6,687,671 B2 | * | 2/2004 | Gudorf et al. .................. | 704/235 |
| 6,732,074 B1 | * | 5/2004 | Kuroda .......................... | 704/244 |
| 6,839,669 B1 | * | 1/2005 | Gould et al. .................... | 704/246 |
| 2002/0046028 A1 | * | 4/2002 | Saito ............................... | 704/251 |
| 2002/0065657 A1 | * | 5/2002 | Reding et al. .................. | 704/246 |
| 2002/0116194 A1 | * | 8/2002 | Lewis et al. .................... | 704/257 |

(Continued)

FOREIGN PATENT DOCUMENTS

JP 9-9199 1/1997

(Continued)

OTHER PUBLICATIONS

Japanese Office Action dated Feb. 16, 2006, issued in priority Japanese Application No. 2002-054368.

*Primary Examiner* — Leonard Saint Cyr
(74) *Attorney, Agent, or Firm* — Staas & Halsey LLP

(57) ABSTRACT

A user term information extraction unit extracts term information of a user out of information that has been input by the user to an application for use other than speech recording beforehand, and a speech recognition dictionary management unit expands a vocabulary of a speech recognition dictionary according to the term information of the user. Next, the user inputs speech via a speech input unit, and a speech recognition unit executes speech recognition using the speech recognition dictionary. A representative term information selection unit extracts the term information of the user contained in the speech recognition result, and selects one or a plurality of pieces of representative term information from the term information of the user. A speech file recording unit records the speech data as a speech file, and renders a file name of the speech file according to the representative term information. Thus, a speech recognition and speech file recording system is provided that records input data as a speech file and automatically renders a file name thereto with which a content of the file can be grasped immediately.

27 Claims, 13 Drawing Sheets

U.S. PATENT DOCUMENTS

2003/0033152 A1* 2/2003 Cameron ................ 704/275
2004/0039570 A1* 2/2004 Harengel et al. ............ 704/232

FOREIGN PATENT DOCUMENTS

| | | |
|---|---|---|
| JP | 11-327583 | 11/1999 |
| JP | 2000-020279 | 1/2000 |
| JP | 2000-089931 | 3/2000 |
| JP | 2000-181492 | 6/2000 |
| JP | 2000-348064 | 12/2000 |
| JP | 2002-14693 | 1/2002 |
| JP | 2002-49390 | 2/2002 |

* cited by examiner

```
┌─────────────────────────────┐
│    Basic Vocabulary Part    │
│                             │
│         . . . .             │
│                             │
│         . . . .             │
│                             │
│         . . . .             │
├─────────────────────────────┤
│   User Term Information Part│
│                             │
│         . . . .             │
│                             │
│         . . . .             │
│                             │
│         . . . .             │
└─────────────────────────────┘
```

FIG. 4

SPEECH RECOGNITION SYSTEM AND SPEECH FILE RECORDING SYSTEM

BACKGROUND OF THE INVENTION

1. Field of the Invention

The present invention relates generally to a speech recognition system for recognizing input speech data, and speech file recording system and method for recording speech data as speech files. Particularly, the present invention is applied to applications that involve operations for recording speech files, such as speech memo recording applications and speech electronic mail applications, etc., in portable terminals and telephone systems used as personal digital assistances (PDA).

2. Related Background Art

A portable terminal used as a PDA is reduced in size so as to be portable, and it is equipped with a pen or a small-size keyboard as an input device.

In the case of pen input using a pen, information is input by writing text characters to be input, specific marks determined for pen input, etc., or executing pen gestures with a pen tip, such as a cross, on an electronic pad with a pen tip brought into contact with the electronic pad.

In the case where text characters to be input are written on an electronic pad, a character inputting operation and a character recognition operation take much time, which causes an inconvenience to the user who wants to simply record brief memo information when he/she is out on the road or is in a meeting.

In the case where input is carried out by writing specific marks determined for pen input on an electronic pad, or by executing pen gestures with a pen tip, such as a cross, the user needs to memorize such specific marks and gestures. This sometimes is burdensome for the user.

Therefore, speech input has attracted attention for use in portable terminals such as PDA.

If speech input is available, what the user is required to do is simply to input contents of a note to be taken with speech via an equipped microphone. Thus, if a situation allows uttering, memo information can be recorded with speech readily.

FIG. 12 is a view illustrating a conventional speech memo information recording system for recording speech memo information that has been input with speech in a form of a speech file.

510 denotes a microphone, 520 denotes a speech file recording unit, 530 denotes a speech file name input unit, and 540 denotes a speech file reproduction unit.

The user inputs speech via the microphone 510. The speech is converted into speech data by the microphone 510. The speech data is recorded in the speech file recording unit 520 as a speech file. Here, it is necessary to render a file name to the speech file. The user inputs a file name for the speech file via the speech file name input unit 530. It is assumed that a pen input interface, such as a pen provided in a PDA, is provided as the speech file name input unit 530.

It should be noted that instead of the input of a file name by the user him/herself, a serial number may be rendered as a file name automatically by the speech file name input unit 530. In this case, for instance, speech files are named as "speech. 1", "speech. 2", and the like in an order in which they are recorded.

Among conventional PDAs, A speech memo information recording system has been known, which receives speech input, and does not record the input speech data as a speech file but executes a speech recognition operation subsequently, and records the same as a text file.

FIG. 13 is a view illustrating a conventional speech memo information recording system involving a speech recognition operation.

610 denotes a microphone, 620 denotes an acoustic analysis unit, 630 denotes an acoustic model, 640 denotes a speech recognition dictionary, and 650 denotes a matching recognition unit.

The user inputs speech via the microphone 610. The speech is converted into speech data by the microphone 610. The acoustic analysis unit 620 executes acoustic analysis to the speech data. The speech data are divided into phoneme units, and a feature value is extracted from each phoneme unit. The acoustic model 630 stores a set of feature values of phoneme units as a model in a data format for the matching of data. For instance, a probability model employing the Hidden Markov Model (HMM) is used.

The matching recognition unit 650 compares feature values of phoneme units of acoustic data supplied from the acoustic analysis unit 620 with a set of the feature value data of phoneme units stored in the acoustic model 630, for instance, a probability model of feature values of phoneme units, and recognizes the phoneme units of the input acoustic data. Here, the matching recognition unit 650 refers to the speech recognition dictionary 640, checks whether the information composed of the recognized phoneme units is recognizable as words, such as registered words, and outputs the recognized words as a speech recognition result.

Here, the performance of the speech recognition is significantly dependent on vocabulary of a dictionary stored in the dictionary storing unit 640. Only in the case where the word input by the user is included in the vocabulary of the dictionary, the speech recognition can be carried out. The expansion of the vocabulary of the dictionary increases the number of words that can be recognized in the speech recognition operation, but a small-size portable terminal such as a PDA has only a limited dictionary capacity, and an increase in the number of terms in the vocabulary causes a matching operation to take more time. Therefore, a vocabulary of a dictionary is limited.

Then, the utilization of a user dictionary whose vocabulary is customizable for a user is carried out widely, so that terms the user inputs are covered efficiently using the limited vocabulary.

The above-described conventional speech memo information recording system, however, has the following problems.

In the case where the user him/herself inputs a speech file name by inputting text data, a problem arises in this action by the user for giving the speech file name is inconvenient for the user.

The simplicity of inputting memo information with speech is impaired by the above-described inconvenience for the user of inputting a file name for the recorded information by pen input or keyboard entry, which is bothersome for the user.

Since a file name has to be given in a text data form, a constituent part that conducts a speech recognition operation is indispensable so as to give a file name by speech input.

Furthermore, as described above, in the case where a serial number rendered automatically is given as a file name to a speech file, the user does not have to input a file name. However, in the case where a multiplicity of speech memo information pieces are recorded as speech files, contents of the recorded speech files cannot be grasped from the serial numbers, and hence, a problem arises in that, in referring to the speech memo information, it is difficult to find which speech file records the speech memo information to be referred to.

Next, in the case of a speech memo information recording system that executes speech recognition of speech memo information input with speech and records the speech memo information in a text file form, the user incurs the difficulty in customizing the user dictionary.

As described above, to improve the recognition accuracy of the speech recognition, it is necessary to prepare a user dictionary having a vocabulary that efficiently covers terms that are presumed to be input by the user, with a limited vocabulary capacity. This user dictionary is necessarily built up by the user him/herself, which is bothersome for the user. If the building up of the user dictionary is carried out by pen input or keyboard entry, this bothersome work for the user increases further.

SUMMARY OF THE INVENTION

Therefore, with the foregoing in mind, it is an object of the present invention to provide, by solving the foregoing problems, a speech file recording system that is capable of recording speech memo information input by speech input as a speech file, automatically rendering to the speech file a file name with which the contents of the speech memo information can be grasped immediately, and automatically building up a user dictionary having a vocabulary efficiently covering terms that are presumed to be input by the user.

To achieve the foregoing object, a speech recognition system of the present invention includes: a user term information extraction unit for extracting term information of a user from information input by the user to a certain application; a speech recognition dictionary management unit having a first speech recognition dictionary, and expanding a vocabulary of the first speech recognition dictionary according to the term information of the user; a speech input unit through which speech data of the user are input; and a speech recognition unit for executing speech recognition of the speech data using the first speech recognition dictionary.

The foregoing configuration allows the speech recognition dictionary to be expanded according to the user term information used by the user in another application, thereby automatically generating the speech recognition dictionary having a vocabulary that efficiently covers terms that are presumed to be input by the user.

The speech recognition system of the present invention may further include a speech recognition server on a network, for executing speech recognition using a second speech recognition dictionary having a larger vocabulary than that of the first speech recognition dictionary. Here, it is possible that, in the case where the speech recognition unit exhibits a lower recognition accuracy or reliability than a predetermined value, the speech recognition unit transmits the speech data to the speech recognition server via the network, and the speech recognition server executes speech recognition of the speech data, and transmits a result of the speech recognition to the speech input unit.

The foregoing configuration makes it possible to cause the speech recognition operation to be executed by the speech recognition server. The execution of high-precision recognition operation on the speech recognition server improves the precision of the speech recognition.

It should be noted that in the foregoing configuration, in the case where the speech recognition dictionary management unit expands the vocabulary of the speech recognition dictionary according to the result of the speech recognition by the speech recognition server, it is possible to update the vocabulary of the speech recognition dictionary appropriately. Furthermore, it is preferable also that a selection unit is provided so that the user selects whether the vocabulary of the speech recognition dictionary is to be expanded or not.

Next, a speech file recording system of the present invention includes a representative term information selection unit for extracting term information of the user contained in a result of the speech recognition which is input from the speech recognition system of the present invention, and selecting, as representative term information of the user, one or a plurality of pieces of information out of the term information of the user, and a speech file recording unit for recording the speech data as a speech file. The speech file recording unit renders a file name of the speech file according to the representative term information of the user.

The foregoing configuration makes it possible to, referring to the representative term information, automatically render a file name with which a content of speech memo information can be grasped immediately.

Next, the speech file recording system of the present invention further includes a speech file server for storing the speech file on the network. In the system, the speech file recording unit transfers the speech file and a retrieval keyword to the speech file server via the network so that the speech file is stored in the speech file server, and the file name and retrieval keyword of the speech file, and a network address of the speech file server are recorded in the speech file recording unit.

The foregoing configuration allows the speech file to be stored in the speech file server, thereby allowing for a decrease in a memory capacity of a portable terminal the user uses.

It should be noted that the speech file recording system configured as above preferably further includes a digest speech data generation unit for, prior to the transfer of the speech file to the speech file server by the speech file recording unit, extracting a part of the speech data recorded in the speech file, and generating digest speech data of the speech file, and in the configuration, the speech file recording unit preferably records the digest speech data in addition to the file name and retrieval keyword of the speech file, and the network address of the speech file server.

The foregoing configuration makes it possible to grasp the content of the speech file immediately by referring to the digest data.

Next, the speech file recording system of the present invention further includes an electronic mail generating unit. The electronic mail generating unit generates an electronic mail composed of a title and a text, assigning a content of a recognition result of the speech data in the speech file as the text of the electronic mail, assigning the term information of the user contained in the recognition result of the speech data in the speech file as the title of the electronic mail, and rendering a file name of the electronic mail according to the representative term information.

The foregoing configuration makes it possible to generate an electronic mail containing the content of the recognition result of the speech data in the speech file, and to automatically render a file name with which the content of the file can be grasped immediately.

Furthermore, the electronic mail generating unit may assign a file name of the speech file and a network address of the speech file server as the text of the electronic mail, and assign the term information of the user contained in the recognition result of the speech data of the speech file as the title of the electronic mail.

The foregoing configuration allows a person receiving the electronic mail to obtain the file name of the speech file and

BRIEF DESCRIPTION OF THE DRAWINGS

FIG. 4 is a view schematically illustrating a vocabulary of a speech recognition dictionary.

DETAILED DESCRIPTION OF THE INVENTION

Figure 1:
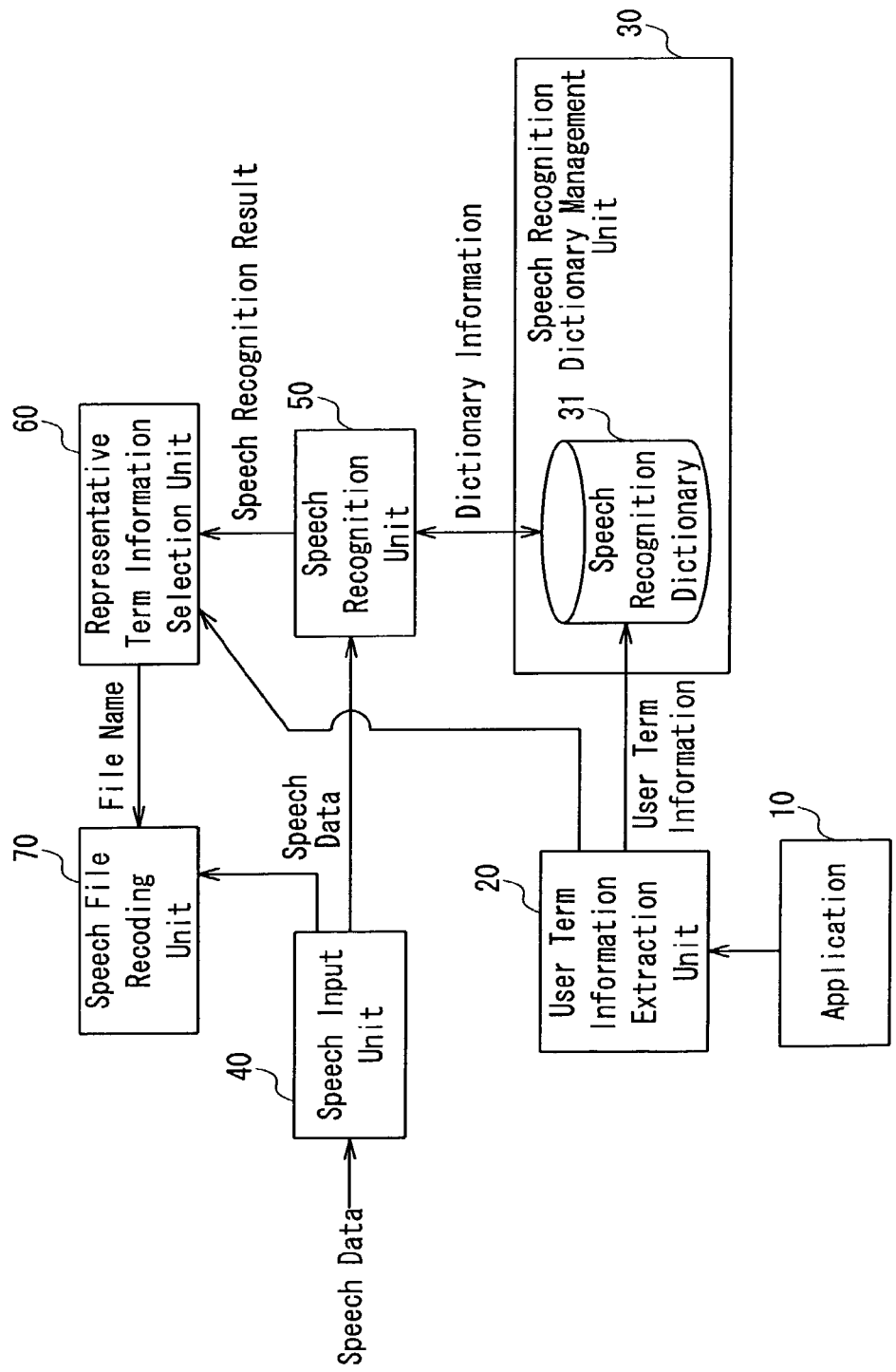
FIG. 1 is a view illustrating a configuration of a first speech file recording system of the present invention.

The following will describe embodiments of speech recognition systems and methods of the present invention, as well as speech file recording systems and methods of the present invention, while referring to the drawings.

EMBODIMENT 1

The following will describe, as Embodiment 1 of the present invention, a first speech file recording system that is applied in a portable terminal such as a PDA, and that executes an operation of automatically expanding vocabulary of a speech recognition dictionary (hereinafter referred to as automatic vocabulary expansion operation), a speech recognition operation, a speech file recording operation, and an operation of automatically rendering a file name to a speech file (hereinafter referred to as automatic file naming operation).

FIG. 1 is a view illustrating a configuration of the first speech file recording system of the present invention according to Embodiment 1.

10 denotes an application for use other than the speech recording, 20 denotes a user term information extraction unit, 30 denotes a speech recognition dictionary management unit, 31 denotes a speech recognition dictionary, 40 denotes a speech input unit, 50 denotes a speech recognition unit, 60 denotes a unit for selecting representative term information of terms that the user uses (hereinafter referred to as representative term information selection unit), and 70 denotes a speech file recording unit.

In the foregoing configuration, constituent elements associated with the automatic vocabulary expansion operation with respect to the speech recognition dictionary 31 are the application 10, the user term information extraction unit 20, and the speech recognition dictionary management unit 30. Constituent elements associated with the speech recognition operation are the speech input unit 40, the speech recognition unit 50, and the speech recognition dictionary 31. Constituent elements associated with the speech file recording operation and the automatic file naming operation are the representative term information selection unit 60 and the speech file recording unit 70.

The application 10 is a certain application for use other than the speech recording. The use of the application is not limited particularly, but herein it is assumed to be an application for use in, for instance, a personal information manager (PIM), for efficiently collecting information of terms that the user uses frequently.

The user term information extraction unit 20 extracts term information of the user from information that the user has input to the application 10.

The speech recognition dictionary management unit 30 includes the speech recognition dictionary 31, and expand the vocabulary of the speech recognition dictionary 31 based on the term information of the user extracted by the user term information extraction unit 20.

The speech input unit 40 is used for inputting speech data of the user. It includes, for instance, a microphone and a sampling unit, and converts input acoustic wave into electric signals, samples the same at a predetermined frequency, and inputs sampling data.

The speech recognition unit 50 executes the speech recognition of speech data using the speech recognition dictionary 31. The speech recognition unit 50 includes an acoustic analysis function and a matching function with an acoustic model. The speech recognition unit 50 divides speech data into phoneme units using the acoustic analysis function, extracts feature values therefrom, and executes the matching on the phoneme unit basis using the foregoing feature values and the matching on the word basis, employing the matching function. The matching on the phoneme bases is carried out by the matching with feature values of the acoustic model, and the matching on the word basis is carried out by the matching with the vocabulary of the speech recognition dictionary 31.

The representative term information selection unit 60 extracts term information of the user contained in the result of the speech recognition by the speech recognition unit 50, and selects, as representative term information, one or a plurality of user term information pieces out of the term information of the user.

The speech file recording unit 70 records speech data input via the speech input unit 40 as a speech file. The speech file recording unit 70 renders a file name to the speech file according to the representative term information selected by the representative term information selection unit 70.

Next, a flow of operations of the first speech file recording system of the present invention is described below.

First of all, a flow of an automatic vocabulary expansion operation with respect to the speech recognition dictionary 31 is described with reference to FIG. 2. The automatic vocabulary expansion operation with respect to the speech recognition dictionary 31 is assumed to be carried out prior to the speech recognition operation, and to be executed appropriately thereafter, so that the speech recognition dictionary 31 is updated automatically. The automatic updating may be carried out, for example, at constant intervals, and/or may be carried out when new data are stored upon use of the PIM application.

In an example described below, the application 10 is assumed to be a PIM application. The PIM application is an application that manages various types of information of the user, such as the user's schedule management data, personal data about the user, address data about the user, the user's business partners, etc. It is assumed that the user customarily uses the PIM application. Various types of data are stored via the PIM application.

First of all, the user term information extraction unit 20 extracts term information of the user contained in the data of the application 10 (Operation 201).

Various terms contained in the data of the application 10 are extracted as the user term information. The term information thus extracted from the application such as the PIM by the user term information extraction unit 20 contains information of terms that the user frequently uses and information of unique terms that the user uses. The following description focuses on a name "A" of a contact person at a partner company that is extracted from the schedule management data of the user. Here, the name "A" is assumed to be so rare that it is not contained in an ordinary speech recognition dictionary.

Next, the speech recognition dictionary management unit 30 expands the vocabulary of the speech recognition dictionary according to the term information of the user extracted by the user term information extraction unit 20 (Operation 202).

Since the vocabulary of the speech recognition dictionary 31 is expanded thus according to the term information of the user, the speech recognition dictionary 31 can be made to cover the information of terms that are presumed to be used by the user frequently and the information of unique terms that the user uses. Furthermore, since the term information can be edited efficiently, the dictionary capacity can be reduced.

FIG. 4 is a view schematically illustrating a vocabulary of a speech recognition dictionary. In this example, the vocabulary includes a basic vocabulary part as a collection of words generally used for speech recognition, and a user term information part that is expanded according to the term information of the user. Here, the term information of the user including the name "A" of the contact person of the partner company, which has been extracted by the user term information extraction unit 20, is added to the user term information part.

The vocabulary of the speech recognition dictionary 31 is expanded through the foregoing operation. The speech recognition dictionary 31 thus expanded is used in the speech recognition operation.

Next, a flow of the speech recognition operation and a subsequent flow of the speech file recording operation and the automatic file naming operation are described below, with reference to FIG. 3.

First of all, the user inputs speech through the speech input unit 40 (Operation 301). Here, it is assumed that the user inputs information about a job to be entrusted to "A" as a speech memo.

Next, the speech recognition unit 50 executes a speech recognition operation with respect to the speech data thus input via the speech input unit 40 (Operation 302). The speech recognition unit 50 executes the speech recognition operation using the speech recognition dictionary 31.

It should be noted that the speech recognition dictionary 31 has been subjected to the automatic vocabulary expansion operation, whereby the vocabulary thereof is expanded. Therefore, the speech recognition dictionary 31 covers the information of frequently-used terms and the information of unique terms the user uses, thereby ensuring efficient recognition of speech data the user inputs. In this case, "A" is a rare name, and cannot be recognized by the basic vocabulary part of the speech recognition dictionary 31, but in the present invention, the speech recognition dictionary 31 includes the user term information part, and hence, it ensures the correct recognition of the name "A".

Next, the representative term information selection unit 60 receives the recognition result from the speech recognition unit 50, and selects representative term information out of the same (Operation 303). The representative term information is representative term information of the user's terms, which is contained in the speech recognition result. For instance, the name "A" of the contact person of the partner company is selected as representative term information.

Next, the speech file recording unit 70 renders a file name of the speech file according to the representative term information, and records the speech file (Operation 304). Here, since the representative term information is representative term information of the user's terms, which is contained in the speech file contents, the automatic naming of a file according to the representative term information makes it possible to render a file name that allows the user to easily recall and grasp the speech file contents.

Thus, using the speech file recording system according to Embodiment 1 of the present invention, it is possible to expand the speech recognition dictionary according to the user term information, thereby making the dictionary have a vocabulary that efficiently covers terms that are presumed to be input by the user. This makes it possible to record input speech data as a speech file, and to automatically render a file name that allows the user to grasp the file contents immediately.

It should be noted that in the foregoing configuration, the user term information extraction unit 20, the speech recognition dictionary management 30, the speech recognition dictionary 31, the speech input unit 40, and the speech recognition unit 50 may be realized as a first speech recognition system independently, and the automatic vocabulary expansion operation with respect to the speech recognition dictionary and the speech recognition operation may be executed by the first speech recognition system.

EMBODIMENT 2

A second speech file recording system according to Embodiment 2 of the present invention utilizes a speech recognition server present on a network, transmits input speech data to the speech recognition server, causes a speech recognition operation to be executed by the speech recognition server, and receives the recognition result. By so doing, the speech file recording operation and the automatic file naming operation are carried out, with the burden of the speech recognition operation on a portable terminal such as a PDA being reduced.

Figure 5:
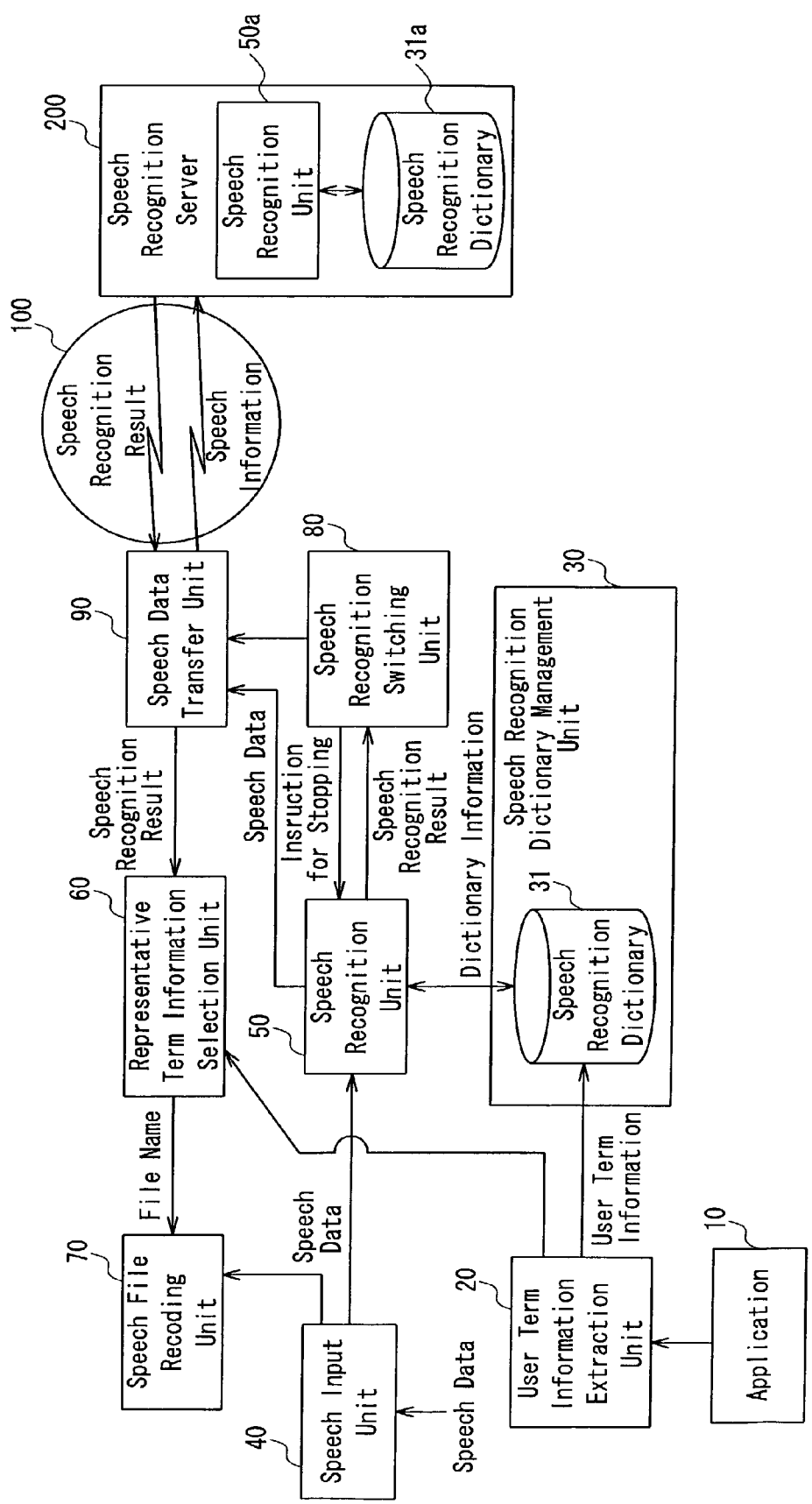
FIG. 5 is a view illustrating a configuration of a second speech file recording system of the present invention.

FIG. 5 is a view illustrating a configuration of the second speech file recording system of the present invention.

Like the first speech file recording system according to Embodiment 1, the second speech file recording system includes the application 10 that is a certain application for use other than the speech recording, the user term information extraction unit 20, the speech recognition dictionary management unit 30, the speech recognition dictionary 31, the speech input unit 40, the speech recognition unit 50, the representative term information selection unit 60, and the speech file recording unit 70. Besides, the second speech file recording system further includes a speech recognition switching unit 80, and a speech data transfer unit 90. On a network 100, a speech recognition server 200 is provided.

The speech recognition switching unit 80 checks a speech recognition accuracy and reliability of the speech recognition unit 50. In the case where the speech recognition accuracy and the reliability are lower than threshold values, the speech recognition switching unit 80 stops the speech recognition operation by the speech recognition unit 50, switches the speech recognition operation from that on the speech file recording system to that executed by the speech recognition server 200.

The speech data transfer unit 90 performs an operation of transferring a speech file that has been input through the speech input unit 40 and temporarily stored in the speech recognition unit 50, via the network 100 to the speech recognition server 200.

The speech recognition server 200 includes a speech recognition dictionary 31a and a speech recognition unit 50a. Here, the speech recognition dictionary 31a of the speech recognition server 200 is a speech recognition dictionary having a larger vocabulary than that of the speech recognition dictionary 31 in the speech file recording system. Since it is a speech recognition dictionary in the speech recognition server 200, the speech recognition dictionary 31a has an enormous vocabulary. The speech recognition unit 50a also has a high-precision algorithm and acoustic model, so as to provide high recognition precision.

Figure 6:
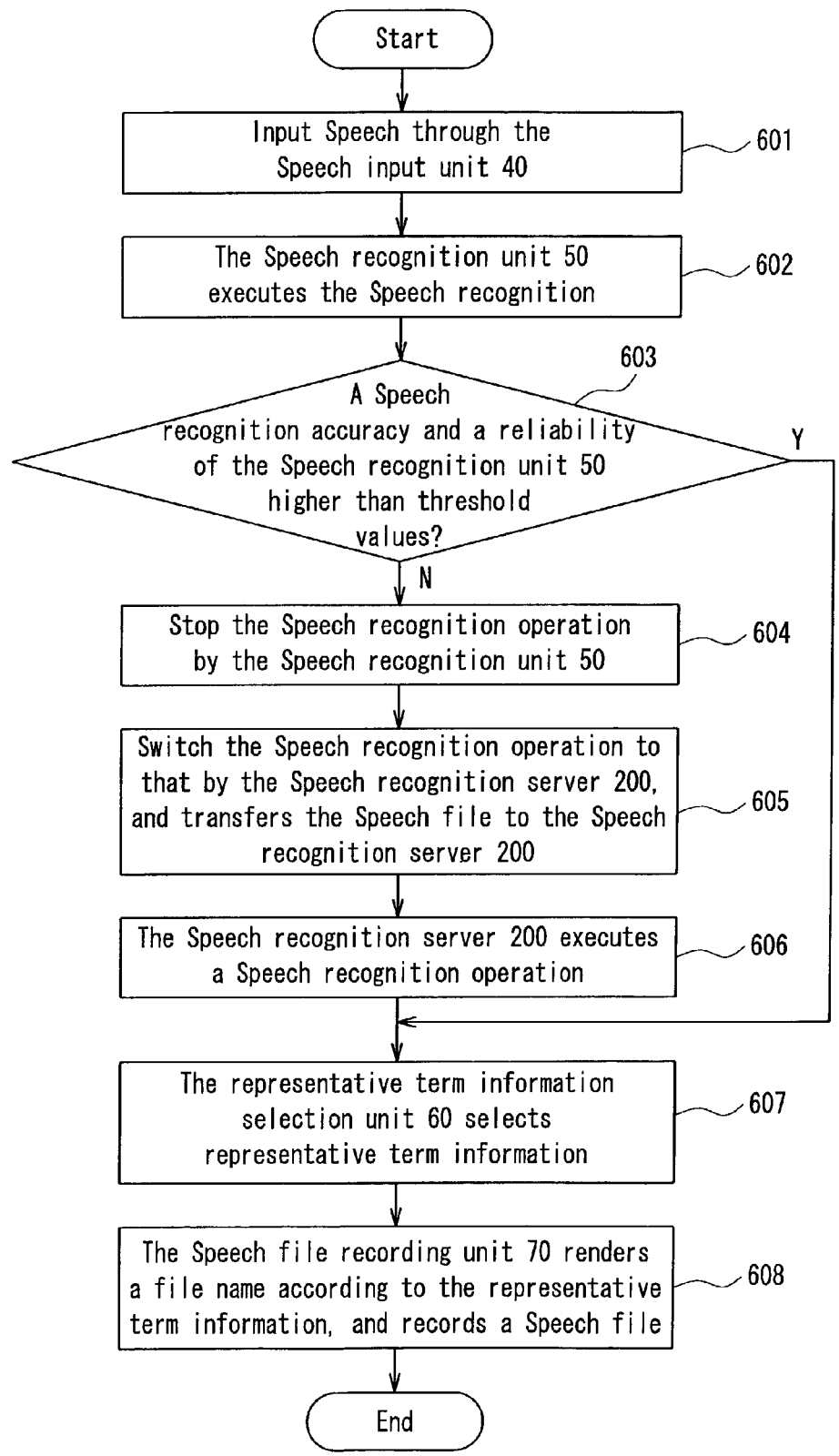
FIG. 6 is a flowchart illustrating a flow of a speech recognition operation, a speech file recording operation, and an automatic file naming operation of the second speech file recording system of the present invention.

Next, a flow of operations of the second speech recording file system is described with reference to FIG. 6.

In the following example, the application 10 is a PIM application. Further, the operation of extracting the user term information by the user term information extraction unit 20, and the operation of expanding the vocabulary of the speech recognition dictionary by the speech recognition dictionary management unit 30 may be the same as those shown by the flowchart of FIG. 2 in conjunction with Embodiment 1.

In the speech recognition operation, first of all, the user inputs speech through the speech input unit 40 (Operation 601).

The speech recognition unit 50 executes a speech recognition operation with respect to the speech data thus input via the speech input unit 40 (Operation 602). The speech recognition unit 50 executes the speech recognition operation using the speech recognition dictionary 31.

Next, the speech recognition switching unit 80 checks a speech recognition accuracy and reliability of the speech recognition unit 50 (Operation 603). In the case where the speech recognition accuracy and the reliability are found to be lower than threshold values according to the checking result (Operation 603: N), the speech recognition switching unit 80 stops the speech recognition operation by the speech recognition unit 50 (Operation 604), switches the same to a speech recognition operation by the speech recognition server 200, and instructs the speech data transfer unit 90 to transfer the speech file to the speech recognition server 200 via the network 100 (Operation 605).

The speech recognition server 200 executes the speech recognition operation with respect to the speech data of the speech file using the speech recognition dictionary 31a (Operation 606), and inputs the speech recognition result obtained to the representative term information selection unit 60 via the network 100.

The representative term information selection unit 60 receives the recognition result from the speech recognition server 200, and selects the representative term information therefrom (Operation 607). The representative term information is representative term information of the user's terms, which is contained in the speech recognition result.

Next, the speech file recording unit 70 renders a file name to the speech file according to the representative term information, and records the speech file (Operation 608).

Through the foregoing operation, the speech recognition is executed by the speech recognition server on the network, the representative term information is selected according to the speech recognition result, and a file name of the speech file is rendered automatically.

It should be noted that the speech recognition dictionary management unit 30 is capable of expanding the vocabulary of the speech recognition dictionary 31 according to the result of the speech recognition of the speech recognition server 200. This is intended to effectively utilize the speech recognition result of the speech recognition server 200. Here, the system may be configured so as to include a selection unit with which the user selects the execution or non-execution of the expansion of the vocabulary. There are cases where a speech recognition result obtained by the speech recognition server 200 is not sufficient, and the use of the foregoing speech recognition result is not necessarily desirable for expanding the vocabulary of the speech recognition dictionary 31.

It should be noted that in the foregoing configuration, the user term information extraction unit 20, the speech recognition dictionary management 30, the speech recognition dictionary 31, the speech input unit 40, the speech recognition unit 50, the speech recognition switching unit 80, and the speech data transfer unit 90 may be realized as a first speech recognition system independently, and the automatic vocabulary expansion operation with respect to the speech recognition dictionary and the speech recognition operation may be executed by the first speech recognition system.

EMBODIMENT 3

A third speech file recording system according to Embodiment 3 of the present invention utilizes a speech file server on a network so as to conduct a speech file recording operation on the speech file server. By storing the speech file on the speech file server, the system makes it unnecessary to carry out a recording operation on a portable terminal such as a PDA.

Figure 7:
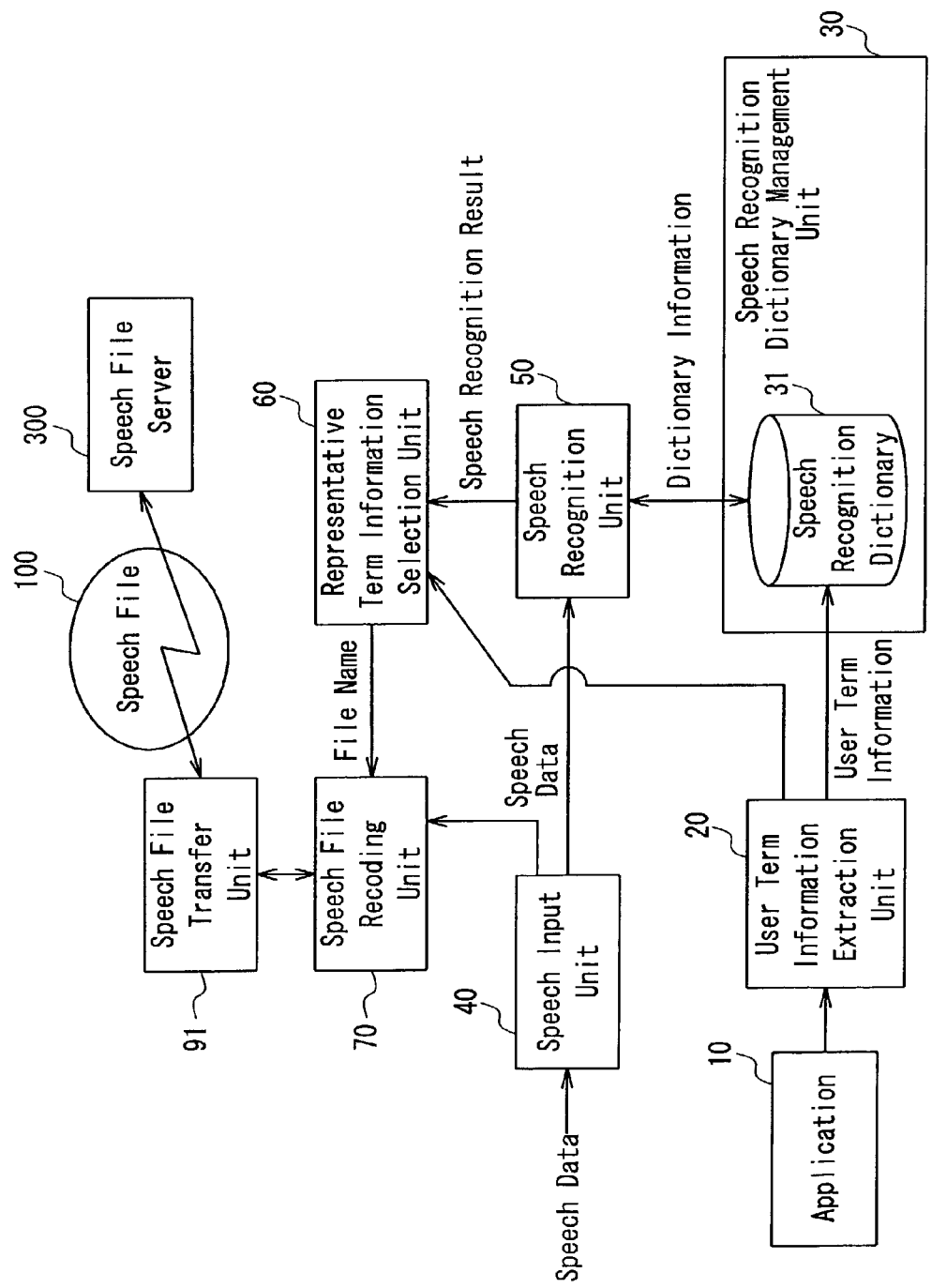
FIG. 7 is a configuration of a third speech file recording system of the present invention.

FIG. 7 is a view illustrating a configuration of the third speech file recording system of the present invention.

The speech file recording system according to Embodiment 3, as in Embodiment 1, includes the application 10 that is a certain application for use other than the speech recording, the user term information extraction unit 20, the speech recognition dictionary management unit 30, the speech recognition dictionary 31, the speech input unit 40, the speech recognition unit 50, the representative term information selection unit 60, and the speech file recording unit 70. Besides, the second speech file recording system further includes a speech file transfer unit 91. On a network 100, a speech file server 300 is provided.

The speech file transfer unit 91 performs an operation of transferring a speech file that has been input through the speech input unit 40 and temporarily stored in the speech file recording unit 70, via the network 100 to the speech file server 300. Besides, a file name of a speech file and a network address of the speech file server are recorded in the speech file recording unit 70. Furthermore, it is possible to record the digest speech data.

Figure 8:
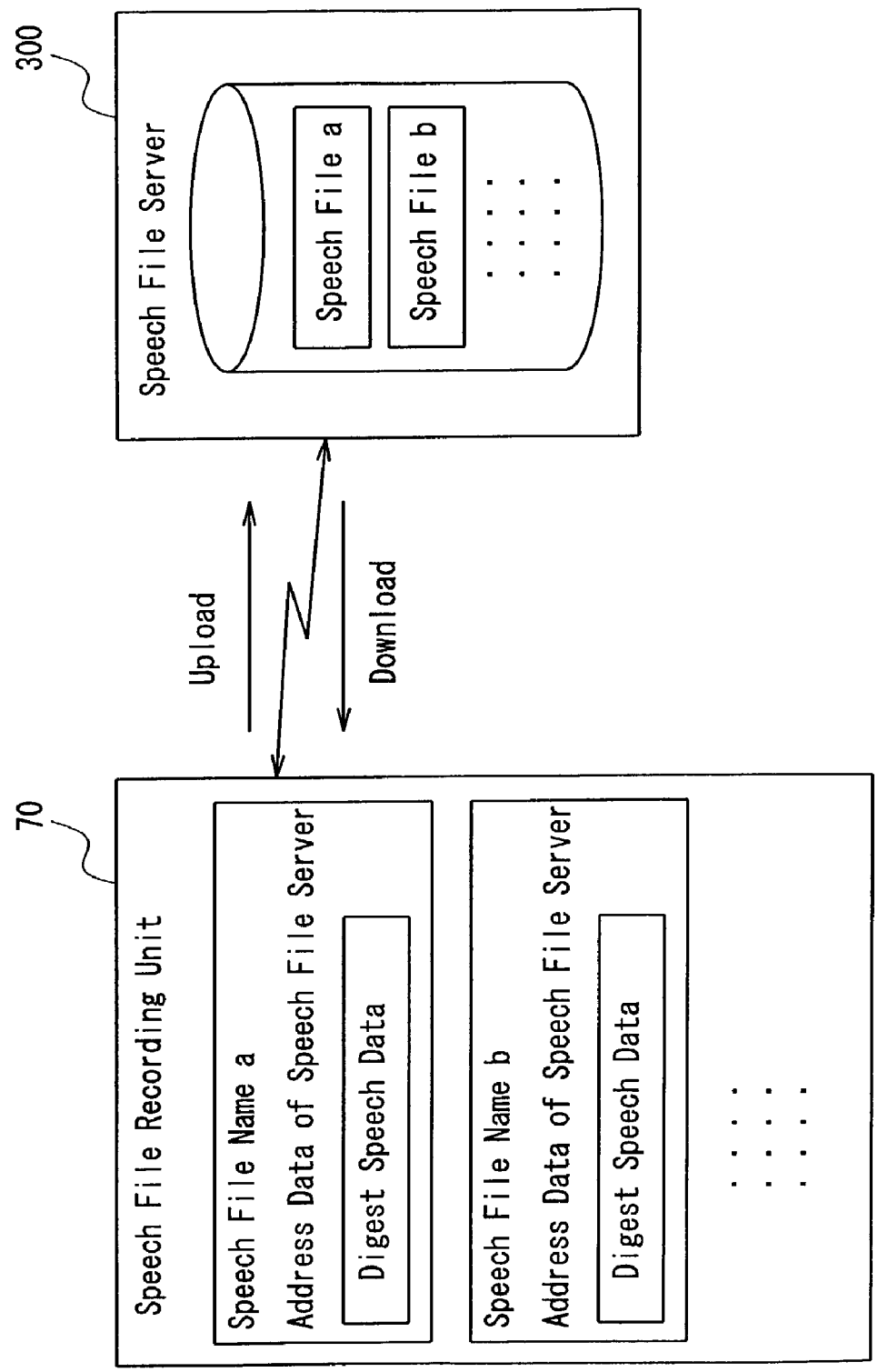
FIG. 8 is a view schematically illustrating a flow of a speech file recording operation in the case where digest speech information is utilized.

The digest speech data is an extracted part of speech data of a speech file. For instance, the digest speech data may be an extracted top part of the speech data of the speech file. Since the digest speech data occupy a small capacity, a small memory capacity suffices to record a multiplicity of sets of digest speech data. Besides, since each set of digest speech data can be reproduced within a short period of time, it can be a help for grasping the contents of the speech file immediately. FIG. 8 is a view schematically illustrating a flow of a speech file recording operation in the case where the digest speech data are employed. FIG. 8 schematically illustrates only the speech file recording unit 70 and the speech file server 300. Only a file name of a speech file, address data of the speech file server 300, and digest speech data are recorded in the speech file recording unit 70, and a main body of the speech file is uploaded to the speech filer server 300 and stored therein.

It should be noted that in the case of a configuration in which the digest speech data are recorded, the speech file recording unit 70 includes a digest speech data generation unit 71. The digest speech data generation unit 71 extracts a part of speech data of a speech file, and generates digest speech data of the speech file.

EMBODIMENT 4

A fourth speech file recording system according to Embodiment 4 has a function of generating an electronic mail having a recognition result of speech data of a speech file as its text.

Figure 9:
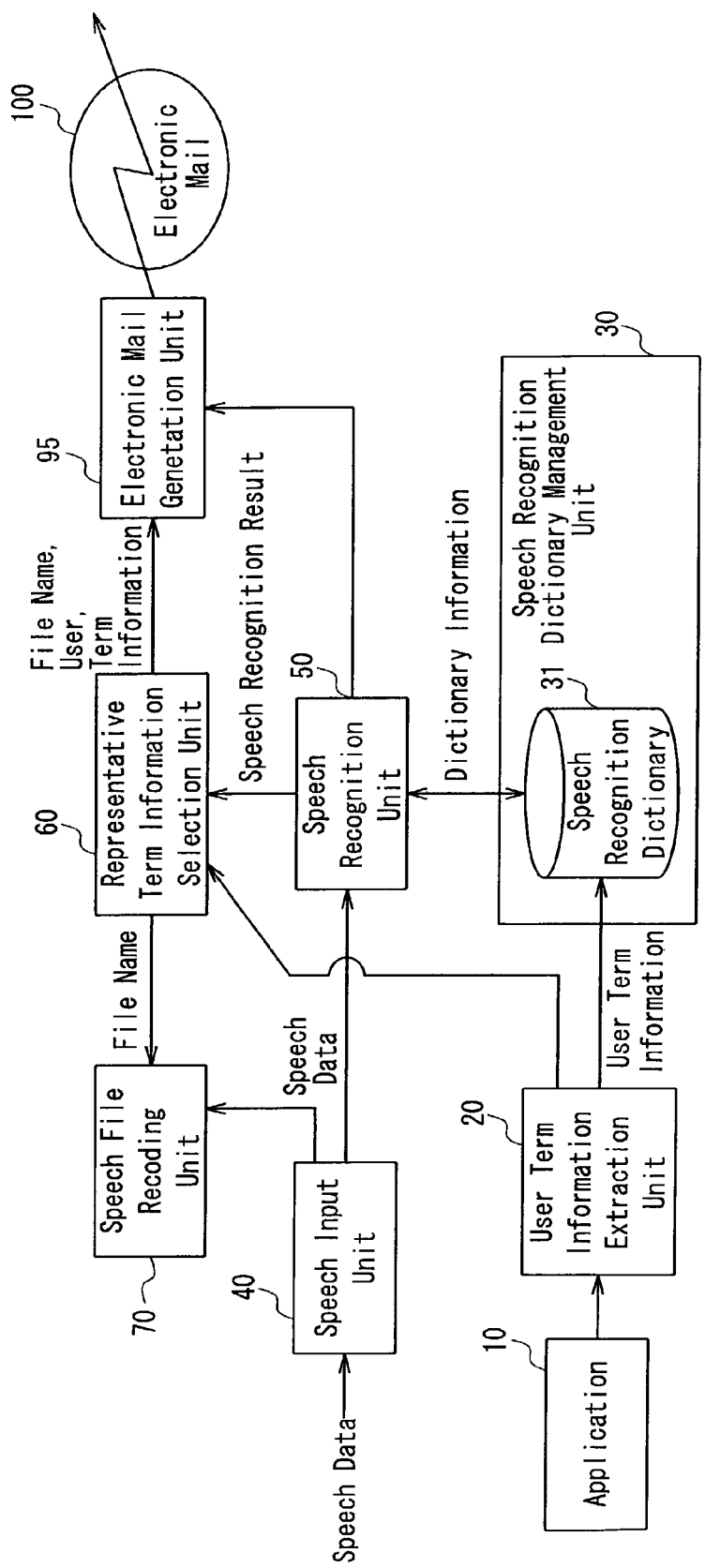
FIG. 9 is a view illustrating a configuration of a fourth speech file recording system of the present invention.

FIG. 9 is a view illustrating a configuration of a fourth speech file recording system of the present invention. The speech file recording system according to Embodiment 4, as in Embodiment 1, includes the application 10 for use other than the speech recording, the user term information extraction unit 20, the speech recognition dictionary management unit 30, the speech recognition dictionary 31, the speech input unit 40, the speech recognition unit 50, the representative term information selection unit 60, and the speech file recording unit 70. Besides, the fourth speech file recording system further includes an electronic mail generation unit 95.

The electronic mail generation unit 95 receives the result of speech recognition by the speech recognition unit 50, and generates an electronic mail having the recognition result of speech data of a speech file as its text. Here, the electronic mail generation unit 95 receives representative term information from the representative term information selection unit 60, and renders a title of an electronic mail and a file name of a speech file that is to be attached to the electronic mail, according to the representative term information.

Furthermore, in the case where a speech file is recorded in the speech file server, the electronic mail generation unit 95 generates a file name of the speech file and a network address of the speech file server as a text of an electronic mail, and generates a title of an electronic mail according to the user term information contained in the recognition result of the speech data in the speech file.

Figure 2:
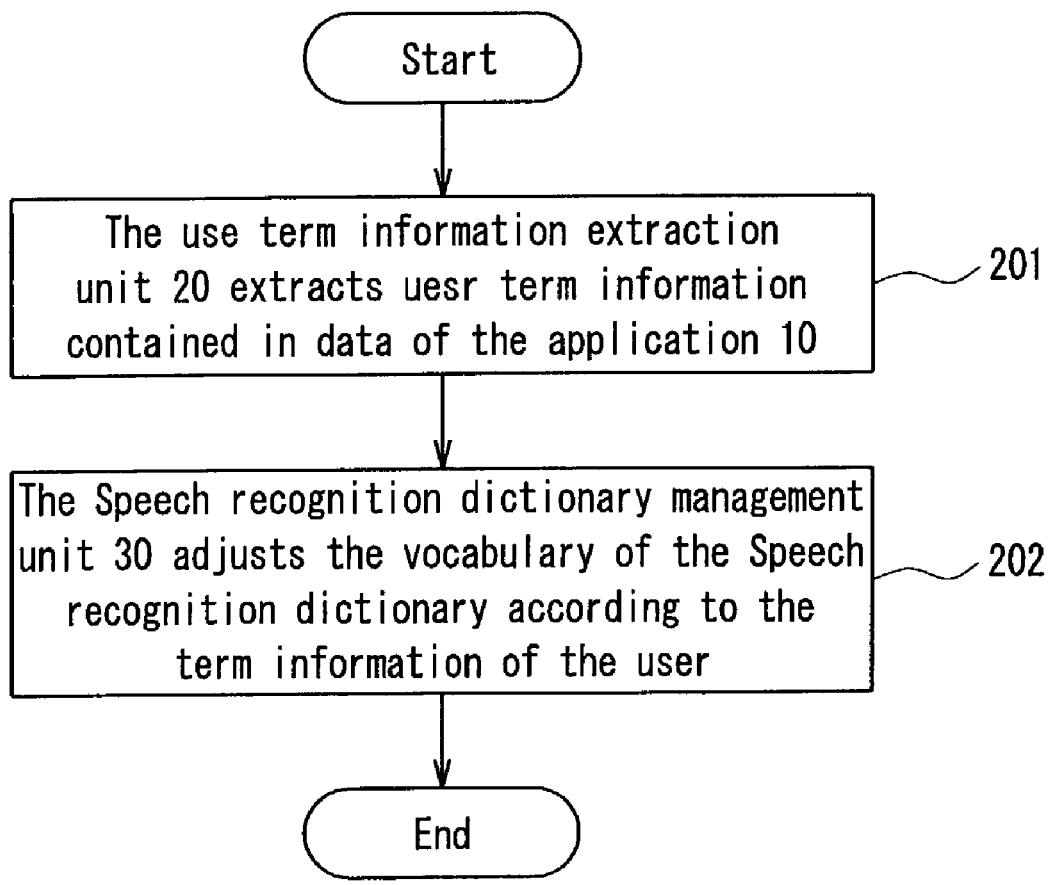
FIG. 2 is a flowchart illustrating a flow of an operation of a speech file recording system.

The operation of extracting the user term information, which is performed by the user term information extraction unit 20, and the operation of expanding the vocabulary of the speech recognition dictionary, which is performed by the speech recognition dictionary management unit 30, may be identical to those shown by the flowchart of FIG. 2, which are described in Embodiment 1.

Figure 3:
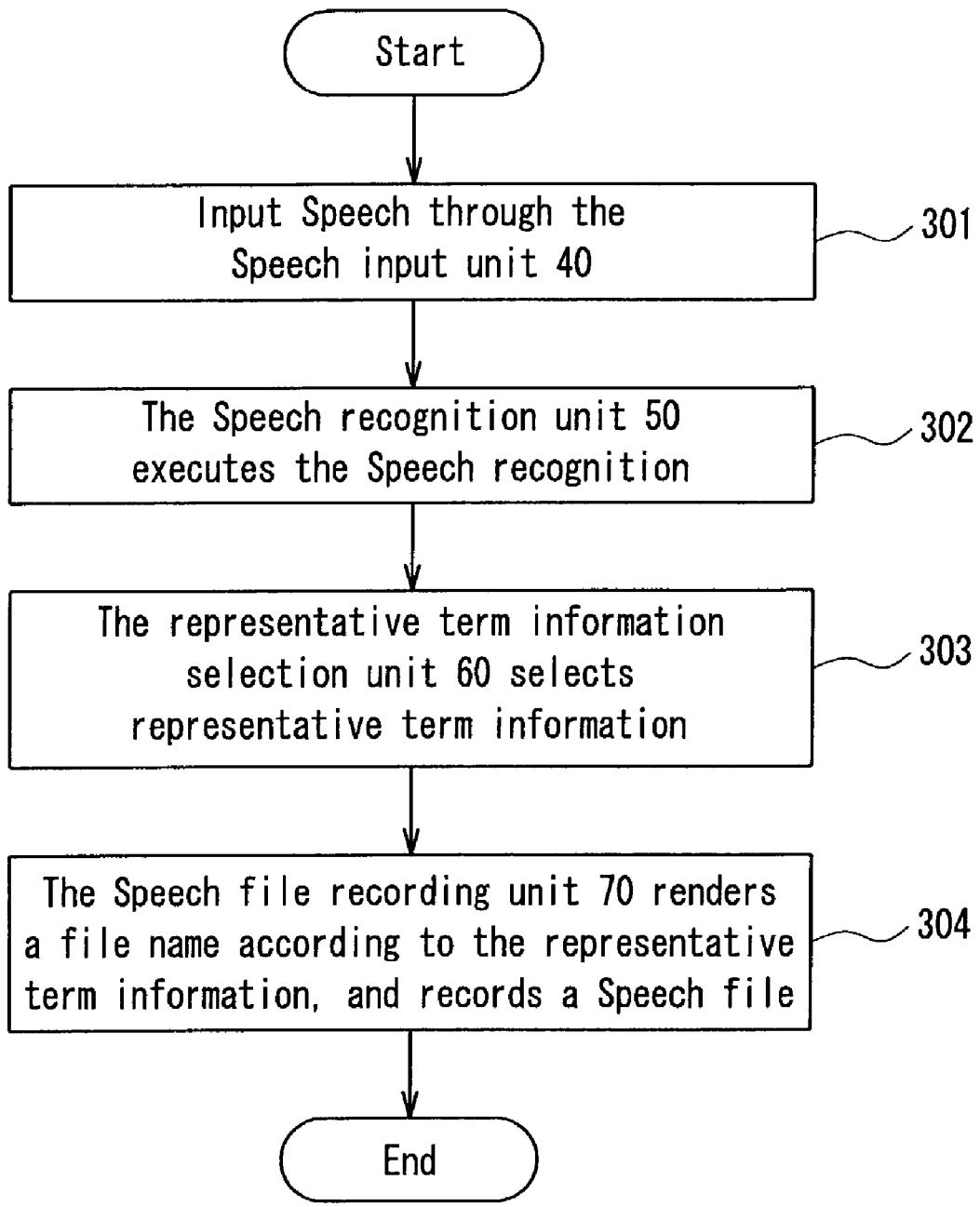
FIG. 3 is a flowchart illustrating a flow of a speech recognition operation, a speech file recording operation, and an automatic file naming operation.
Figure 10:
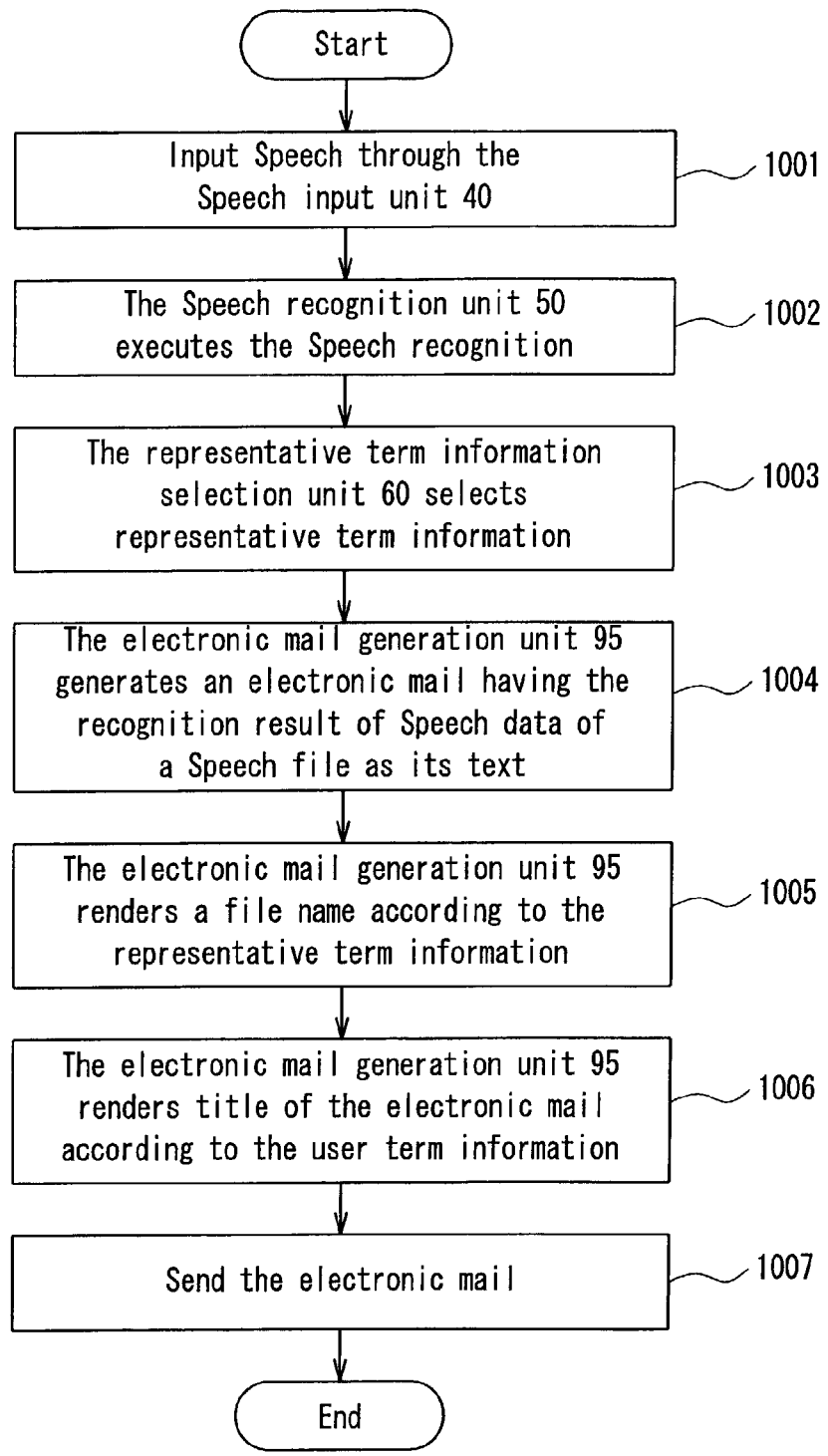
FIG. 10 is a flowchart illustrating a flow of a fourth speech file recording system of the present invention.

A flow of the speech recognition operation, as the flow shown by the flowchart of FIG. 3, which is described in Embodiment 1, involves a speech input operation of inputting a speech through the speech input unit 40 (Operation 1001), a speech recognition operation by the speech recognition unit 50 (Operation 1002), and a representative term information selection operation by the representative term information selection unit 60 (Operation 1003), as shown in FIG. 10. Next, the electronic mail generation unit 95 receives a speech recognition result of the speech recognition unit 50, generates an electronic mail having the recognition result of the speech data of the speech file (Operation 1004), receives the representative term information from the representative term information selection unit 60, renders a file name of the electronic mail according to the representative term information (Operation 1005), and further, generates a title of the electronic mail according to the user term information contained in the recognition result of the speech data in the speech file (Operation 1006). The electronic mail thus generated is transmitted to a destination address (Operation 1007).

EMBODIMENT 5

Figure 11:
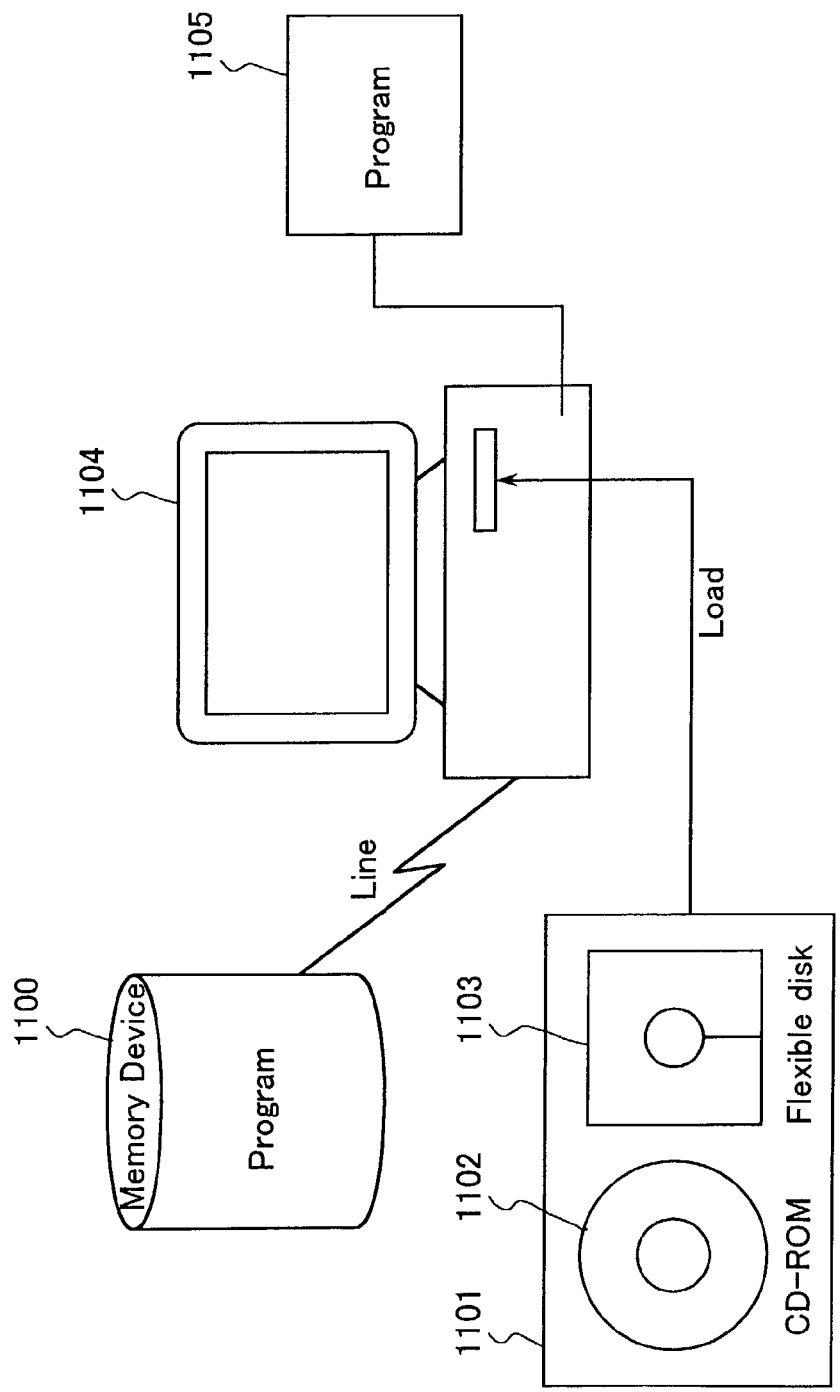
FIG. 11 is a view illustrating an example of a recording medium that stores operations for implementing the speech file recording system of the present invention.
Figure 12:
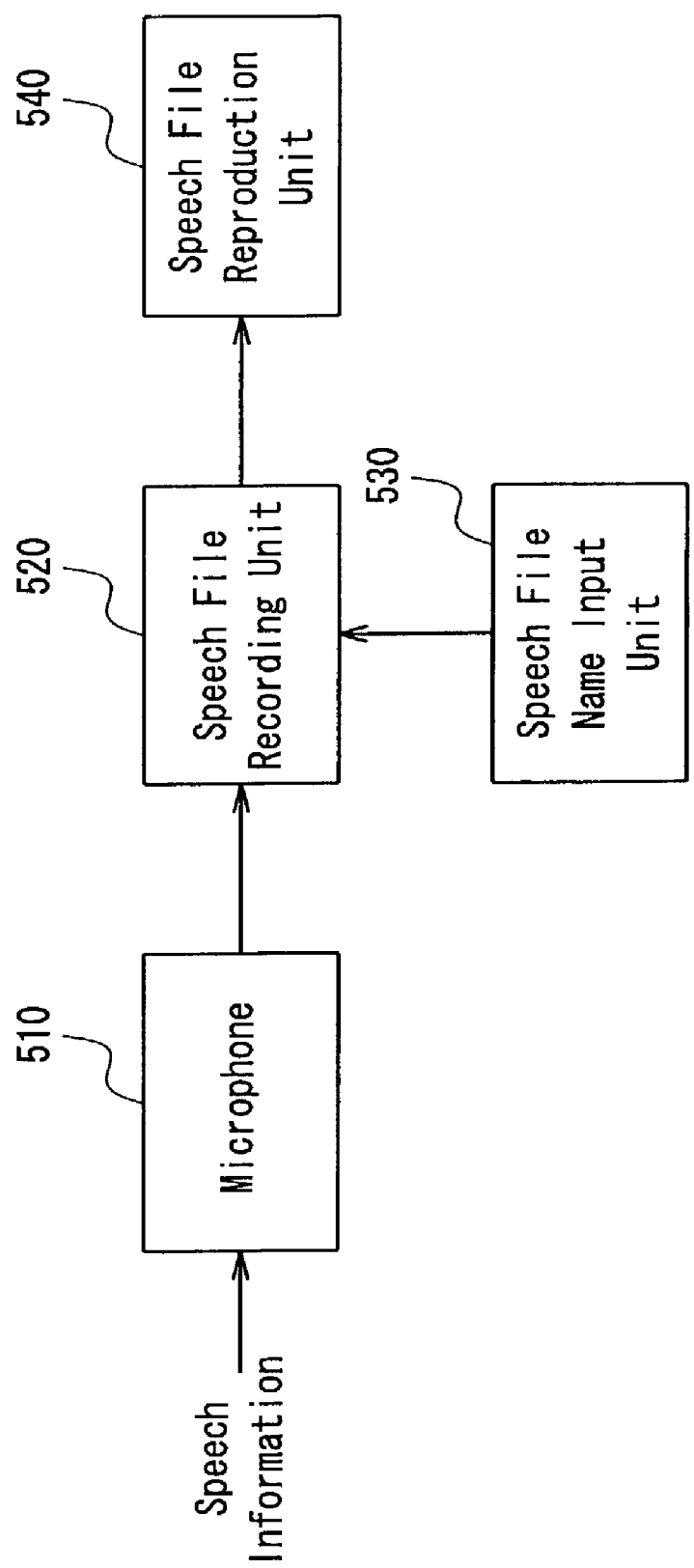
FIG. 12 is a view illustrating a conventional speech memo information recording system in which speech memo information input with speech is recorded as a speech file.
Figure 13:
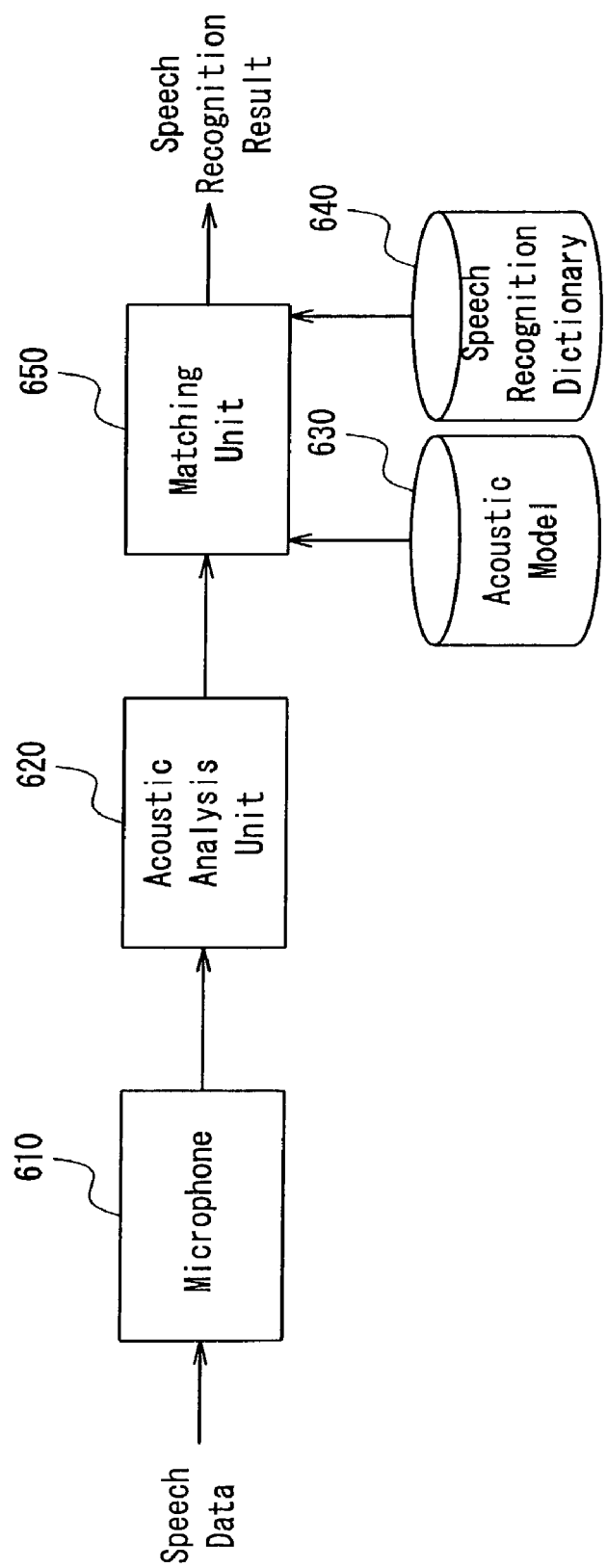
FIG. 13 is a view illustrating a speech memo information recording system that involves a speech recognition operation in the prior art.

The speech recognition operation and the speech file recording operation of the present invention can be described as programs that describe processing operations for implementing the aforementioned operations, and the speech file recording operation of the present invention can be executed by causing a computer to read the program therein. A program including processing operations for implementing the speech file recording system of the present invention can be provided in a state of being stored in not only a portable recording medium 1101 such as a CD-ROM 1102 or a flexible disk 1103 but also a recording medium 1100 in a recording device on the network, or a recording medium 1105 such as a hard disk or a RAM of a computer, or can be downloaded from the network, as shown in an example shown in FIG. 11. Upon the execution of the program, the program is loaded in a computer 1104, and is executed on a main memory.

According to the first speech file recording system of the present invention, a file name with which the contents of the speech memo information can be grasped immediately can be rendered automatically according to the representative term information. Besides, a speech recognition dictionary having a vocabulary that efficiently covers terms that are presumed to be input by the user can be generated automatically using the user term information.

Furthermore, according to the second speech file recording system of the present invention, a speech recognition operation can be executed by a speech recognition server via a network, which allows for a decrease in a load of processing operations on a portable terminal such as a PDA.

Furthermore, according to the third speech file recording system of the present invention, it is possible to store a speech file in the speech file server, which allows for a decrease in a memory capacity of a portable terminal such as a PDA.

Furthermore, according to the fourth speech file recording system of the present invention, an electronic mail may contains the recognition result of speech data in a speech file as its text, as well as a file name of the speech file, a network address of a speech file server, digest speech data, etc. as its text also. The title of the electronic mail may be generated according to the term information of the user contained in the recognition result of speech data in the speech file.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A speech recognition system comprising:
    a user term information extraction unit extracting automatically a user word that a user frequently uses or that is unique to the user from terms contained in data of an application for use other than speech recording when new data are stored upon use of the application;
    a speech recognition list management unit having a first speech recognition list of recognition candidates, wherein said speech recognition list management unit adds a new recognition candidate to the first speech recognition list according to the user word;
    a speech input unit, including at least one microphone, through which speech data of the user are input;
    a speech recognition unit, comprising a server, executing speech recognition of the speech data using the first speech recognition list;
    a speech file recording unit recording the input speech data as a speech file;
    a speech file server storing the speech file on a network, the speech file recording unit transferring the speech file to the speech file server via the network so that the speech file is stored in the speech file server, the file name of the speech file and a network address of the speech file server being recorded in the speech file recording unit; and
    a digest speech data generation unit that, prior to the transfer of the speech file to the speech file server by the speech file recording unit, extracts a part of the speech data recorded in the speech file and generates digest speech data of the speech file,
    wherein the speech file recording unit records the digest speech data in addition to the file name of the speech file and the network address of the speech file server.

2. The speech recognition system according to claim 1, further comprising a speech recognition server on the network executing speech recognition using a second speech recognition list having a larger number of recognition candidates than that of the first speech recognition list,
    wherein, when the speech recognition unit exhibits a lower recognition accuracy or reliability than a predetermined value, the speech recognition unit transmits the speech data to the speech recognition server via the network, and
    the speech recognition server executes speech recognition of the speech data and transmits a result of the speech recognition to the speech input unit.

3. The speech recognition system according to claim 2, wherein the speech recognition list management unit adds the result of the speech recognition by the speech recognition server as a new recognition candidate to the first speech recognition list.

4. The speech recognition system according to claim 3, further comprising a selection unit with which the user selects whether or not an addition of a new recognition candidate to the first speech recognition list by the speech recognition list management unit is executed.

5. A speech file recording system comprising:
    a user term information extraction unit extracting automatically a user word that a user frequently uses or that is unique to the user from terms contained in data of an application for use other than speech recording when new data are stored upon use of the application;
    a speech recognition list management unit having a first speech recognition list of recognition candidates, wherein said speech recognition list management unit adds a new recognition candidate to the first speech recognition list according to the user word;
    a speech input unit, including at least one microphone, through which speech data of the user are input;
    a speech file recording unit recording the input speech data as a speech file;
    a speech recognition unit, comprising a server, executing speech recognition of the speech data using the first speech recognition list;
    a representative term information selection unit extracting a word used by the user contained in a result of the speech recognition, and selecting, as a representative word used by the user, one or a plurality of pieces of information out of the word used by the user;
    a speech file server storing the speech file on a network, the speech file recording unit transferring the speech file to the speech file server via the network so that the speech file is stored in the speech file server, the file name of the speech file and a network address of the speech file server being recorded in the speech file recording unit; and
    a digest speech data generation unit that, prior to the transfer of the speech file to the speech file server by the speech file recording unit, extracts a part of the speech data recorded in the speech file and generates digest speech data of the speech file,
    wherein the speech file recording unit records the digest speech data in addition to the file name of the speech file and the network address of the speech file server, and
    wherein the speech file recording unit renders a file name of the speech file according to the representative word used by the user.

6. The speech file recording system according to claim 5, further comprising a speech recognition server on the network executing speech recognition using a second speech recognition list having a larger number of recognition candidates than that of the first speech recognition list,
    wherein, when the speech recognition unit exhibits a lower recognition accuracy or reliability than a predetermined value, the speech file recording unit transmits the speech file to the speech recognition server via the network,
    the speech recognition server executes speech recognition of the speech data, and
    the representative term information selection unit receives the result of the speech recognition from the speech recognition server via the network, extracts the word used by the user contained in the result of the speech recognition by the speech recognition server, and selects, as the representative word used by the user, one or a plurality of pieces of information out of the word used by the user.

7. The speech file recording system according to claim 6, further comprising an electronic mail generating unit for generating an electronic mail composed of a title and a text, assigning a content of a recognition result of the speech data of the speech file as the text of the electronic mail, assigning the word used by the user contained in the recognition result of the speech data of the speech file as the title of the electronic mail, and rendering a file name of the electronic mail according to the representative word used by the user.

8. The speech file recording system according to claim 7, further comprising an electronic mail generating unit for generating an electronic mail composed of a title and a text, and assigning the file name of the speech file and a network address of the speech file server as the text of the electronic mail, and the word used by the user contained in the recognition result of the speech data of the speech file as the title of the electronic mail.

9. The speech file recording system according to claim 5, further comprising an electronic mail generating unit generating an electronic mail composed of a title and a text, assigning a content of a recognition result of the speech data of the speech file as the text of the electronic mail, assigning the word used by the user contained in the recognition result of the speech data of the speech file as the title of the electronic mail, and rendering a file name of the electronic mail according to the representative word used by the user.

10. The speech file recording system according to claim 9, further comprising an electronic mail generating unit for generating an electronic mail composed of a title and a text, and assigning the file name of the speech file and a network address of the speech file server as the text of the electronic mail, and the word used by the user contained in the recognition result of the speech data of the speech file as the title of the electronic mail.

11. The speech recognition system according to claim 5, wherein the user term information extraction unit extracts the user word used by the user from information input by the user to the application for use other than speech recording.

12. The speech recognition system according to claim 11, wherein the application for use other than speech recording is a personal information manager application.

13. A speech file recording system comprising:
a user term information extraction unit for extracting term information of a user from information input by the user to a certain application;
a speech recognition dictionary management unit having a first speech recognition dictionary, wherein said speech recognition dictionary management unit adds vocabulary to the first speech recognition dictionary according to the term information of the user;
a speech input unit, including at least one microphone, through which speech data of the user are input;
a speech file recording unit recording the input speech data as a speech file;
a speech recognition unit, executing speech recognition of the speech data using the first speech recognition dictionary; and
a representative term information selection unit extracting term information of the user contained in a result of the speech recognition, and selecting, as a representative term information of the user, one or a plurality of pieces of information out of term information of the user,
wherein the speech file recording unit renders a file name of the speech file according to the representative word used by term information of the user;
a speech file server for storing the speech file on the network, wherein
the speech file recording unit transfers the speech file and a retrieval keyword to the speech file server via the network so that the speech file is stored in the speech file server, and
the file name and retrieval keyword of the speech file, and a network address of the speech file server are recorded in the speech file recording unit;
a digest speech data generation unit for, prior to the transfer of the speech file to the speech file server by the speech file recording unit, extracting a part of the speech data recorded in the speech file, and generating digest speech data of the speech file,
wherein the speech file recording unit records the digest speech data in addition to the file name and retrieval keyword of the speech file, and the network address of the speech file server.

14. A speech file recording system comprising:
a user term information extraction unit extracting a word used by a user from information input by the user to a certain application;
a speech recognition dictionary management unit having a first speech recognition dictionary, wherein said speech recognition dictionary management unit adds a word to be output as a recognition result to the first speech recognition dictionary according to the word used by the user;
a speech input unit, including at least one microphone, through which speech data of the user are input;
a speech file recording unit recording the input speech data as a speech file;
a speech recognition unit executing speech recognition of the speech data using the first speech recognition dictionary; and
a representative term information selection unit extracting a term information of the user contained in a result of the speech recognition, and selecting, as a representative term information of the user, one or a plurality of pieces of information out of the user,
wherein the speech file recording unit renders a file name of the speech file according to the representative term information of the user;
a speech file server for storing the speech file on the network, wherein
the speech file recording unit transfers the speech file and a retrieval keyword to the speech file server via the network so that the speech file is stored in the speech file server, and
the file name and retrieval keyword of the speech file, and a network address of the speech file server are recorded in the speech file recording unit;
a digest speech data generation unit for, prior to the transfer of the speech file to the speech file server by the speech file recording unit, extracting a part of the speech data recorded in the speech file, and generating digest speech data of the speech file,
wherein the speech file recording unit records the digest speech data in addition to the file name and retrieval keyword of the speech file, and the network address of the speech file server.

15. A speech recognition method comprising:
extracting automatically a user word that a user frequently uses or that is unique to the user from terms contained in data of an application for use other than speech recording when new data are stored upon use of the application;
holding a speech recognition list of recognition candidates, and adding a new recognition candidate to the speech recognition list, which is held for speech recognition, according to the extracted user word;
inputting speech data of the user;
executing speech recognition, using a server, of the speech data using the speech recognition list;
recording the input speech data as a speech file in a speech file recording unit;
storing the speech file by a speech file server on a network, the speech file recording unit transferring the speech file to the speech file server via the network so that the speech file is stored in the speech file server, the file name of the speech file and a network address of the speech file server being recorded in the speech file recording unit; and extracting, prior to the transfer of the speech file to the speech file server by the speech file recording unit, a part of the speech data recorded in the speech file and generating digest speech data of the speech file, wherein the speech file recording unit records the digest speech data in addition to the file name of the speech file and the network address of the speech file server.

16. The speech recognition method according to claim 15, wherein the user term information extraction unit extracts the user word used by the user from information input by the user to the application for use other than speech recording.

17. The speech recognition method according to claim 16, wherein the application for use other than speech recording is a personal information manager application.

18. A non-transitory computer-readable recording medium storing a speech recognizing operation program recognizing input speech data, the program causing a computer to execute:

extracting automatically a user word that a user frequently uses or that is unique to the user from terms contained in data of an application for use other than speech recording when new data are stored upon use of the application;

holding a speech recognition list of recognition candidates and adding a new recognition candidate to the speech recognition list according to the extracted user word;

inputting speech data of the user;

executing speech recognition of the speech data using the speech recognition list;

recording the input speech data as a speech file in a speech file recording unit;

storing the speech file by a speech file server on a network, the speech file recording unit transferring the speech file to the speech file server via the network so that the speech file is stored in the speech file server, the file name of the speech file and a network address of the speech file server being recorded in the speech file recording unit; and extracting, prior to the transfer of the speech file to the speech file server by the speech file recording unit, a part of the speech data recorded in the speech file and generating digest speech data of the speech file, wherein the speech file recording unit records the digest speech data in addition to the file name of the speech file and the network address of the speech file server.

19. The non-transitory computer-readable recording medium storing a speech recognizing operation program according to claim 18, further comprising the program codes for extracting the user word used by the user from information input by the user to the application for use other than speech recording.

20. The non-transitory computer-readable recording medium storing a speech recognizing operation program according to claim 19, wherein the application for use other than speech recording is a personal information manager application.

21. A speech file recording method comprising:

extracting automatically a user word that a user frequently uses or that is unique to the user from terms contained in data of an application for use other than speech recording when new data are stored upon use of the application;

holding a speech recognition list of recognition candidates, and adding a new recognition candidate to the speech recognition list according to the extracted user word;

inputting speech data of the user;

recording the input speech data as a speech file in speech file recording unit;

executing speech recognition, using a server, of the speech data using the speech recognition list; and extracting a word used by the user contained in a result of the speech recognition, and selecting, as a representative word used by the user, one or a plurality of pieces of information out of the word used by the user;

storing the speech file by a speech file server on a network, the speech file recording unit transferring the speech file to the speech file server via the network so that the speech file is stored in the speech file server, the file name of the speech file and a network address of the speech file server being recorded in the speech file recording unit; and extracting, prior to the transfer of the speech file to the speech file server by the speech file recording unit, a part of the speech data recorded in the speech file and generating digest speech data of the speech file, wherein the speech file recording unit records the digest speech data in addition to the file name of the speech file and the network address of the speech file server, and wherein a file name of the speech file is rendered according to the representative word used by the user.

22. The speech file recording method according to claim 21, wherein the extracted user word used by the user is carried out from information input by the user to the application for use other than speech recording.

23. The speech file recording method according to claim 22, wherein the application for use other than speech recording is a personal information manager application.

24. A non-transitory computer-readable recording medium storing a speech file recording program for recording input speech data as a speech file, the program causing a computer to execute:

extracting automatically a user word that a user frequently uses or that is unique to the user from terms contained in data of an application for use other than speech recording when new data are stored upon use of the application;

holding a speech recognition list of recognition candidates and adding a new recognition candidate to the speech recognition list according to the extracted user word;

inputting speech data of the user;

recording the input speech data as a speech file in speech file recording unit;

executing speech recognition of the speech data using the speech recognition list;

extracting a word used by the user contained in a result of the speech recognition, and selecting, as a representative word used by the user, one or a plurality of pieces of information out of the word used by the user; and rendering a file name of the speech file according to the representative word used by the user;

storing the speech file by a speech file server on a network, the speech file recording unit transferring the speech file to the speech file server via the network so that the speech file is stored in the speech file server, the file name of the speech file and a network address of the speech file server being recorded in the speech file recording unit; and extracting, prior to the transfer of the speech file to the speech file server by the speech file recording unit, a part of the speech data recorded in the speech file and generating digest speech data of the speech file,
wherein the speech file recording unit records the digest speech data in addition to the file name of the speech file and the network address of the speech file server, and.

25. The non-transitory computer-readable recording medium storing a speech file recording program for recording input speech data according to claim 24, further comprising the program codes for extracting the user word used by the user from information input by the user to the application for use other than speech recording.

26. The non-transitory computer-readable recording medium storing a speech file recording program for recording input speech data according to claim 25, wherein the application for use other than speech recording is a personal information manager application.

27. A speech recognition system comprising:
- a user term information extraction unit for extracting automatiocally a user word that a user frequently uses or that is unique to the user from terms contained in data of an application for use other than speech recording when new data are stored upon use of the application;
- a speech recognition list management unit having a first speech recognition list of recognition candidates, wherein said speech recognition list management unit adds a new recognition candidate to the first speech recognition list according to the user word;
- a speech input unit, including at least one microphone, through which speech data of the user are input;
- a speech recognition unit, comprising a server, for executing speech recognition of the speech data using the first speech recognition list, wherein the application for use other than speech recording is a personal information manager application;
- a speech file recording unit recording the input speech data as a speech file;
- a speech file server storing the speech file on a network, the speech file recording unit transferring the speech file to the speech file server via the network so that the speech file is stored in the speech file server, the file name of the speech file and a network address of the speech file server being recorded in the speech file recording unit; and
- a digest speech data generation unit that, prior to the transfer of the speech file to the speech file server by the speech file recording unit, extracts a part of the speech data recorded in the speech file and generates digest speech data of the speech file,
wherein the speech file recording unit records the digest speech data in addition to the file name of the speech file and the network address of the speech file server.

* * * * *

UNITED STATES PATENT AND TRADEMARK OFFICE
CERTIFICATE OF CORRECTION

| | |
|---|---|
| PATENT NO. | : 7,979,278 B2 |
| APPLICATION NO. | : 10/285482 |
| DATED | : July 12, 2011 |
| INVENTOR(S) | : Naoshi Matsuo |

It is certified that error appears in the above-identified patent and that said Letters Patent is hereby corrected as shown below:

Column 19, Line 18-19 (Approx.), In Claim 27, delete "automatiocally" and insert --automatically--, therefor.

Signed and Sealed this
Fifteenth Day of November, 2011

David J. Kappos
*Director of the United States Patent and Trademark Office*